United States Patent [19]

Kirschner et al.

[11] Patent Number: 4,647,967

[45] Date of Patent: Mar. 3, 1987

[54] HEAD-UP DISPLAY INDEPENDENT TEST SITE

[75] Inventors: Robert K. Kirschner; Hans R. Muller, both of Redmond, Wash.

[73] Assignee: Sundstrand Data Control, Inc., Redmond, Wash.

[21] Appl. No.: 823,710

[22] Filed: Jan. 28, 1986

[51] Int. Cl.⁴ .................. H04N 7/18; G02B 27/14; G09G 3/02

[52] U.S. Cl. .................. 358/109; 358/103; 358/139; 358/250; 340/705; 340/980; 350/172; 350/174

[58] Field of Search .................. 358/93, 103, 108, 109, 358/139, 250, 10; 340/705, 980; 350/172, 174; 434/43, 44

[56] References Cited

U.S. PATENT DOCUMENTS

| | | | |
|---|---|---|---|
| 3,711,826 | 1/1973 | La Russa | 358/250 |
| 3,738,733 | 6/1973 | Pettit | 358/250 |
| 3,778,548 | 12/1973 | Nistri | 358/250 |
| 4,108,025 | 8/1978 | Stine et al. | 81/484 |
| 4,400,731 | 8/1983 | Brown | 358/139 |

*Primary Examiner*—James J. Groody
*Assistant Examiner*—Michael D. Parker
*Attorney, Agent, or Firm*—James A. Gabala; Ted E. Killingsworth; Harold A. Williamson

[57] ABSTRACT

An independent test sight is described for a pilot's head-up display (HUD). In one embodiment, the independent test site comprises a collimator assembly and an aligned periscope assembly. The collimator assembly comprises a source of light, a reticle, and a lens for projecting the image of the reticle. The periscope assembly comprises a rhomboid prism housed within the chassis of the HUD in such a manner that it can be pivoted from a stowed position to an erect position where it projects a reticle pattern in the field of view of the HUD combiner.

22 Claims, 15 Drawing Figures

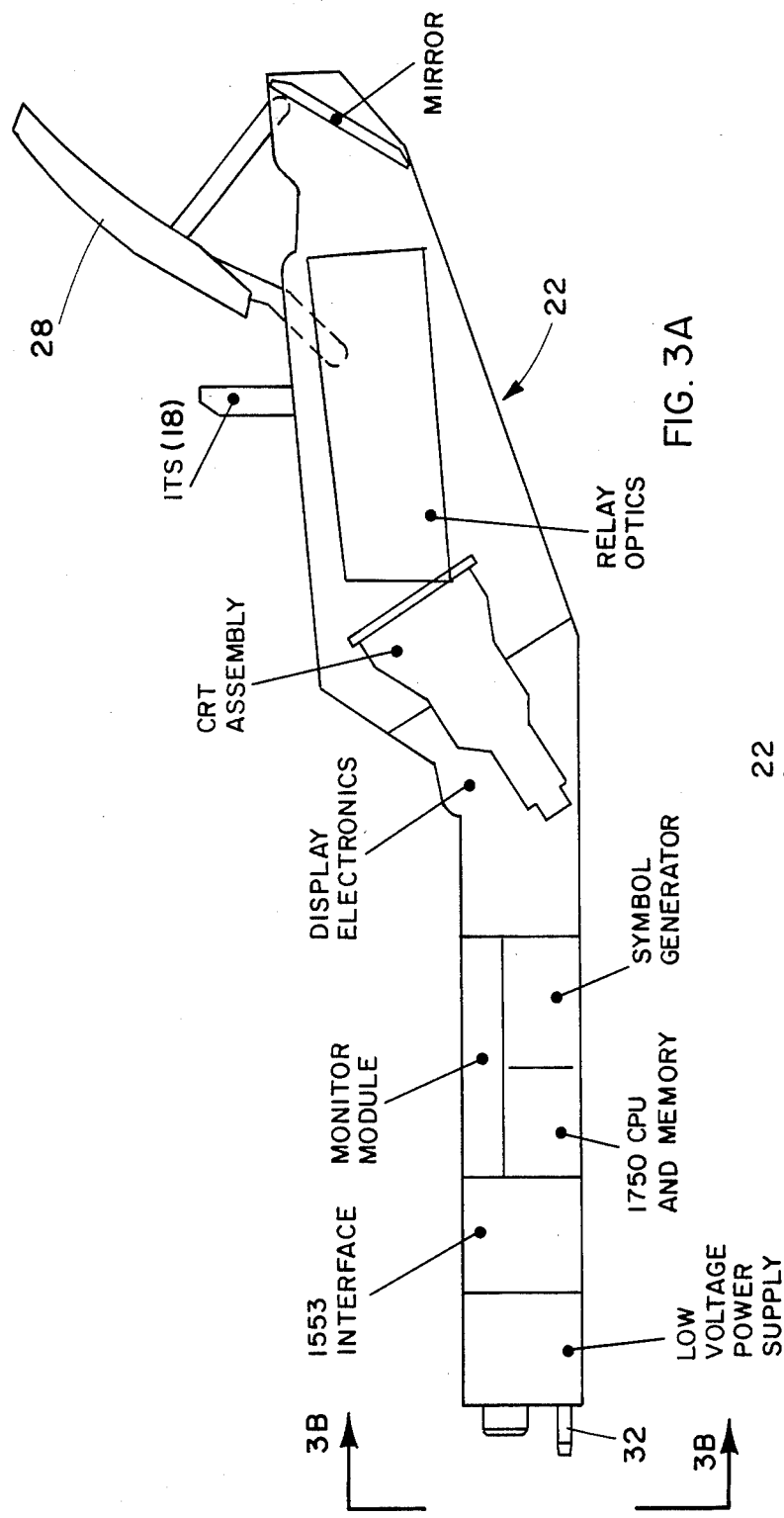
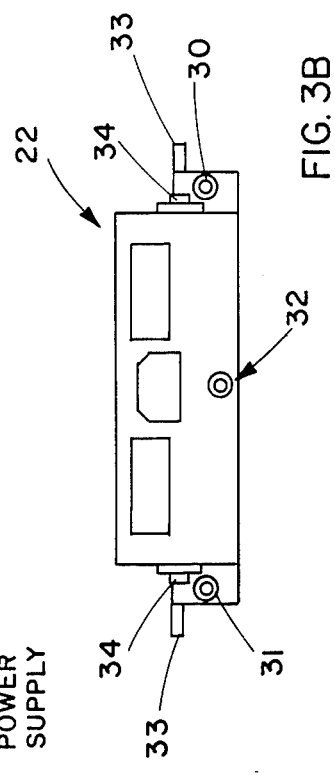
FIG. 3A
FIG. 3B

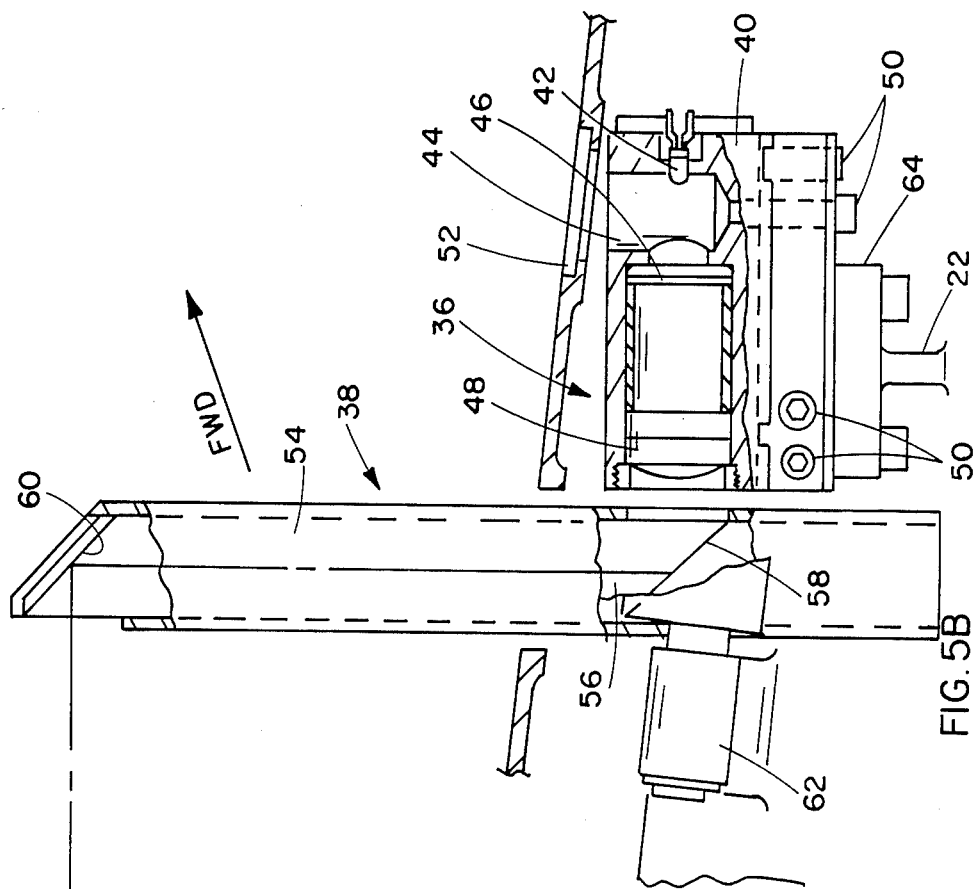
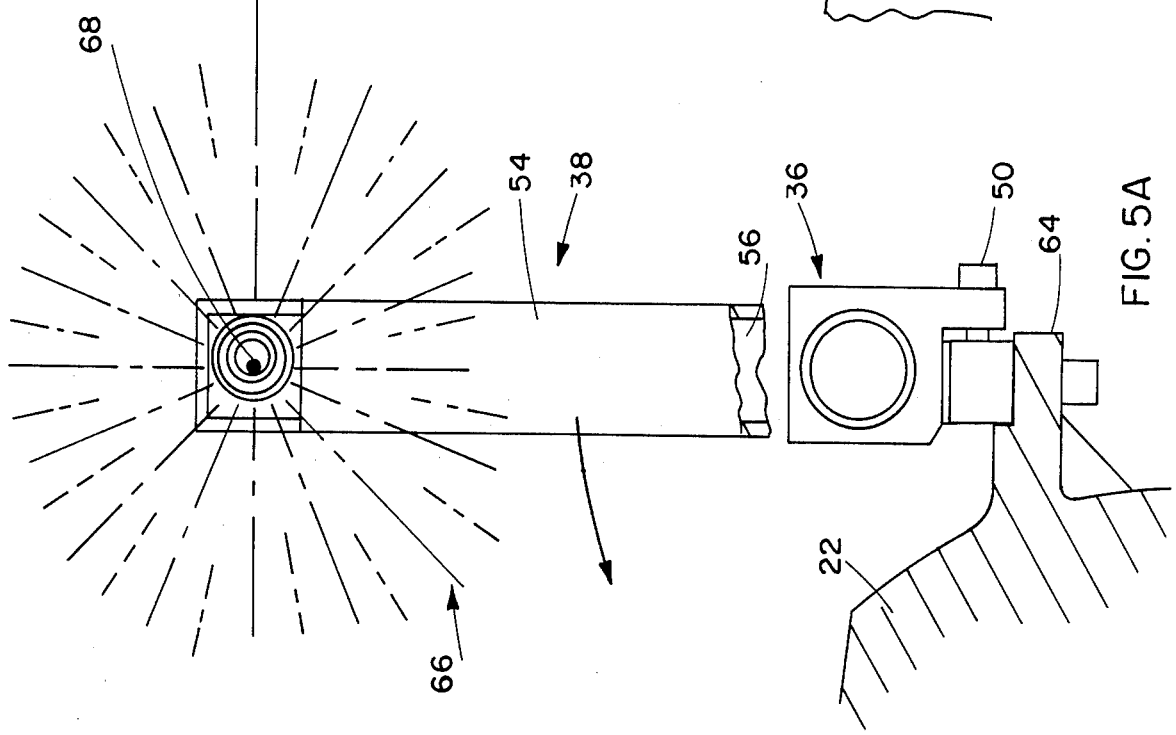

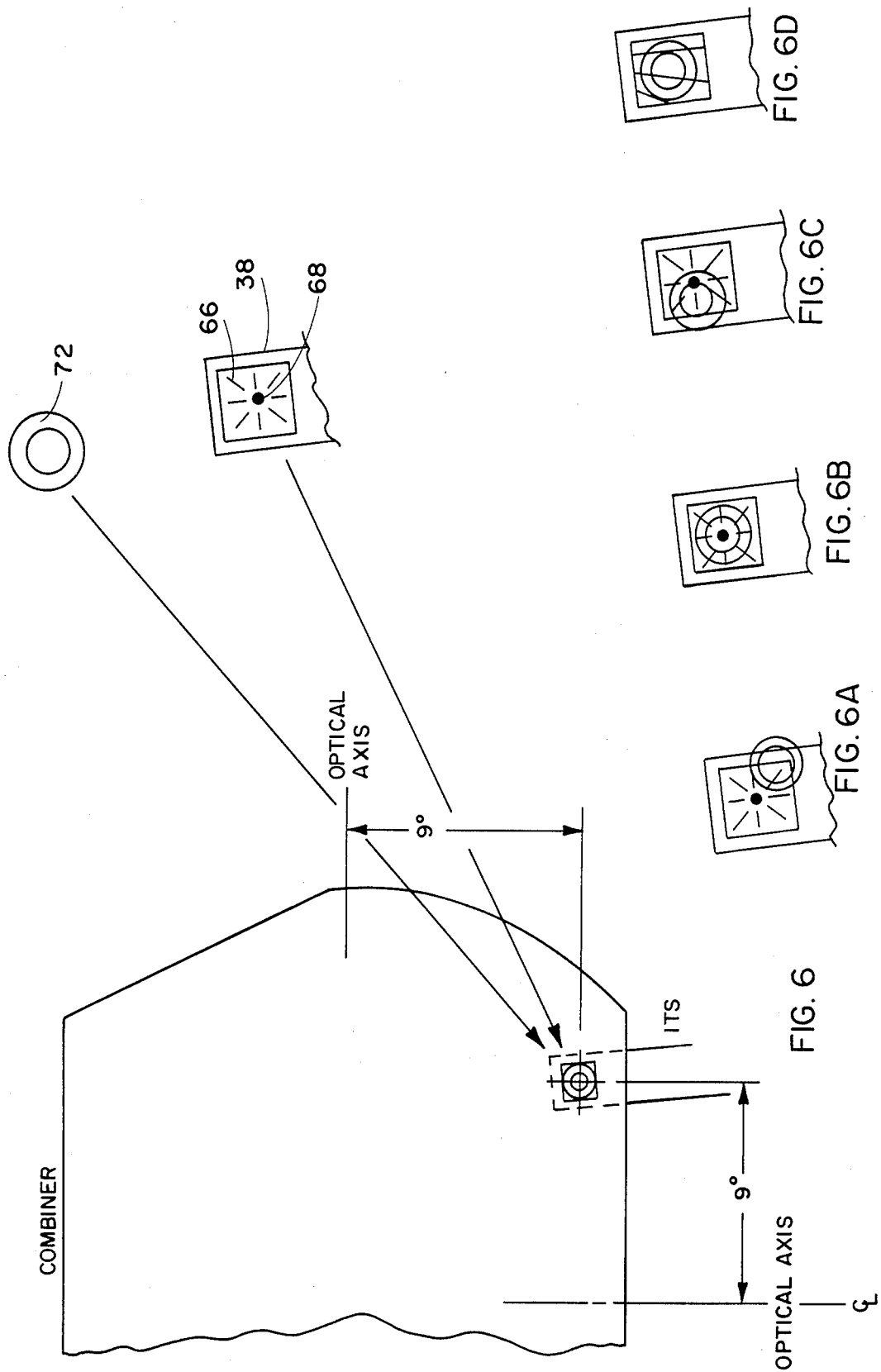

HEAD-UP DISPLAY INDEPENDENT TEST SITE

TECHNICAL FIELD

This invention relates to the general subject of optical alignment devices and test sets; in particular, it relates to an aircraft head-up display and a method and apparatus for independently testing the alignment of such a display.

BACKGROUND OF THE INVENTION

In aeronautical terminology, an apparatus for the presentation of flight data superimposed on the pilot's outside view by semi-transparent imaging means is known as a "head-up display" (HUD). Such a display is particularly useful during landing and during the release of weapons or cargo from the aircraft (i.e., flight and aiming operations).

The data required for the above mentioned flight and aiming operations is prepared or processed by an on-board computer which usually applies digital information to the face of a cathode ray tube (CRT) where the data appears in the form of symbols and images. By means of an optical system, the images thus generated by the CRT are projected to infinity and reflected into the pilot's field of view by a semi-transparent window or combiner to give the pilot a simultaneous view of the image itself and of the distant scene (i.e., the approaching landing field).

Elementary head-up displays are described in U.S. Pat. Nos. 3,816,005 and 3,851,303 both of which are assigned to the Assignee of the present invention. Some head-up displays (i.e., U.S. Pat. No. 2,887,927; 3,438,600; etc.) have many mechanical components. Others have very complicated electronic processing circuits to produce the desired CRT images. All systems suffer from the possibility of alignment errors and optical-mechanical or electronic failure.

The art has recognized the problem of alignment of a head-up display (i.e., U.S. Pat. No. 4,108,025). Fairly detailed, and relatively complicated, optical alignment test systems have been developed (i.e., U.S. Pat. No. 4,400,731). The '731 patent, for example, discloses an apparatus for checking the alignment of a head-up display on the ground or at a test stand physically removed from the normal location of the head-up display. However, such an approach is basically inadequate when the pilot's requirements are considered. Basically, a HUD can serve its intended purpose only if the pilot has complete confidence in it. The accuracy and correct display of the symbology, along with the display availability, are crucial factors in gaining pilot confidence. An on-board system is needed.

Because the electronics associated with a HUD transforms digital data into visual images, it should be evident that an on-board HUD, employing redundant channel comparison on a complete basis (i.e., from input to final image output) is not possible. First of all, there is no simple way to compare visual images to visual images. More importantly, space and other physical constraints make such a system impractical. For this reason, in a so called "redundant channel system", the CRT, the relay optics, and the optical combiner are shared and only the signal processing portion is redundant. Thus, a significant portion of the entire HUD signal processing train, in terms of failure probability, is left unprotected. Therefore, dual redundant signal processing channels that are cross-compared at the output can only do a partial job. More importantly, hardware is doubled and the effect is a degraded mean time between failures (MTBF).

Because of the importance of a head-up display to flight safety and because of the importance of such a display in military aircraft in insuring that the mission of that aircraft may be completed, it is important to have an aircraft head-up display by which the pilot, or other user, can independently check the alignment of that display and the integrity of the signal processing train. A simple system which will allow such a check to be performed fairly quickly would be especially appreciated by the art and would also contribute to improved flight safety and combat mission effectiveness.

SUMMARY OF THE INVENTION

An independent test sight is disclosed for a pilot's head-up display (HUD). Specifically, a HUD is disclosed which includes a combiner, electro-optical means for projecting a test image relative to the combiner and test sighting means, for projecting a target image relative to the combiner, as seen by the pilot, which, in the event that the HUD electronics and optics are properly aligned, essentially coincides with the test image as seen by the pilot. Thus, the test sighting means can be considered an "independent" test sight. In one specific embodiment, the test sight includes a source of light, a reticle, and means for collimating the source on the reticle to form a target image. A bending means or periscope, preferably in the form of a prism defining two parallel spaced apart faces, is provided to bring the target image in the field of view of the pilot. Preferably, the test sight is stowably carried by the chassis of the head-up display in such a manner as to be easily stowed out of view when not in use.

Those skilled in the art should recognize that there are several advantages to employing an independent sighting means. For one, there is negligible availability degradation for the sake of fault detection. Secondly, such a system is less costly and more reliable than a dual channel approach. This is especially true since the test sight is relatively simple and essentially independent of the components forming the HUD. Another advantage is that the detection scheme can quickly distinguish between critical and non-critical faults. Therefore, individual symbol fault annunciation or blanking can be selectively accomplished rather than blanking of the entire display due to relatively minor problems. Many other features and advantages of the invention will become apparent from the discussion which follows.

DESCRIPTION OF THE DRAWINGS

FIG. 3A is a side view of a HUD unit showing the CRT, the associated electronics, the projecting optics, and the ITS;

FIG. 3B is an end view of the apparatus shown in FIG. 3A as viewed along line 3B—3B;

FIGS. 5A and 5B are a partial front elevational view and a partial, cross-sectional, side elevational view of the ITS; and FIGS. 6, 6A, 6B, 6C and 6D are representations of the ITS relative to the combiner for several alignment situations.

DETAILED DESCRIPTION

Figure 1:
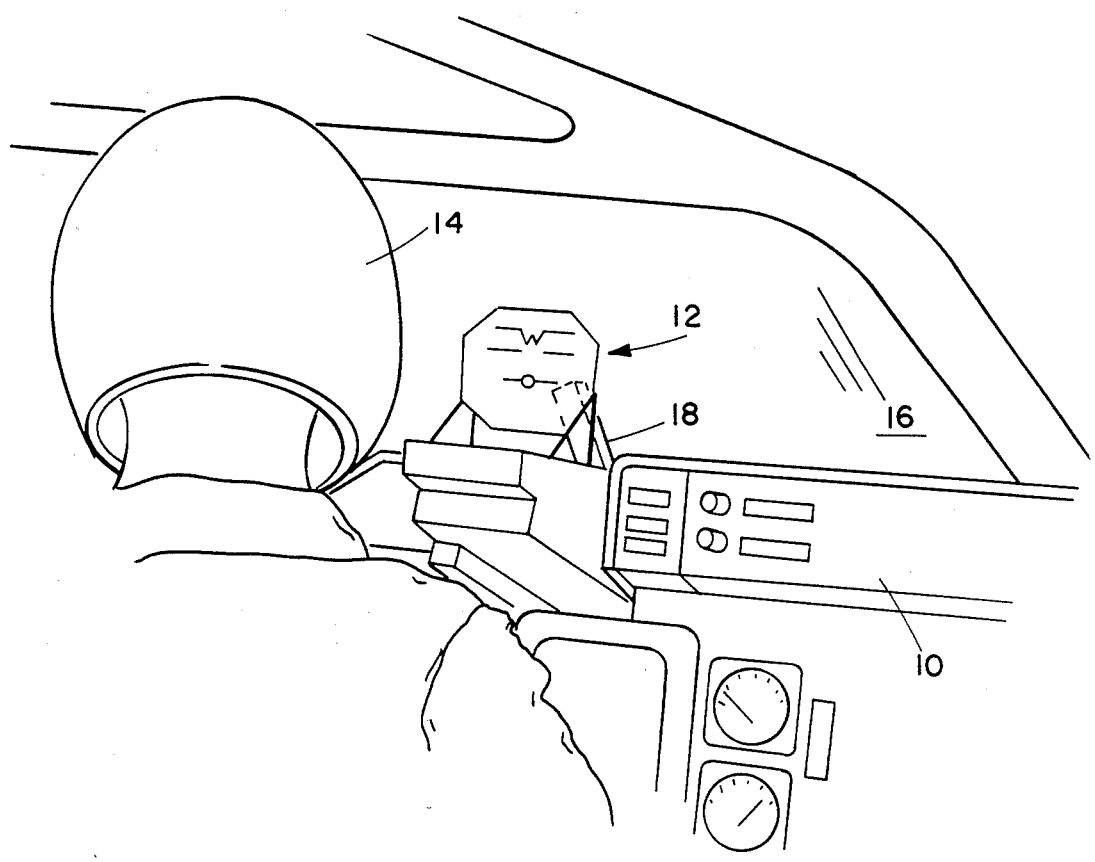
FIG. 1 is a pictorial representation of a head-up display (HUD) located in the cockpit of the aircraft (as seen from behind the pilot's right-hand shoulder); and having the Independent Test Sight (ITS) installed that is the subject of the present invention.

While this invention is susceptible of embodiment in many different forms, there is shown in the drawings and will herein be described in detail several embodiments of the invention. It should be understood, however, that the present disclosure is to be considered an exemplification of the principles of the invention and is not intended to limit the invention to the specific embodiments described.

Components

Turning to the drawings, FIG. 1 is a pictorial representation of the interior of the cockpit of an aircraft. Specifically, there is shown an instrument panel 10 which carries a head-up display (HUD) 12. The HUD 12 is disposed between the pilot 14 and the cockpit wind screen 16. The HUD 12 is provided with an Independent Test Site (ITS) 18 which is the subject of the present invention.

Figure 2:
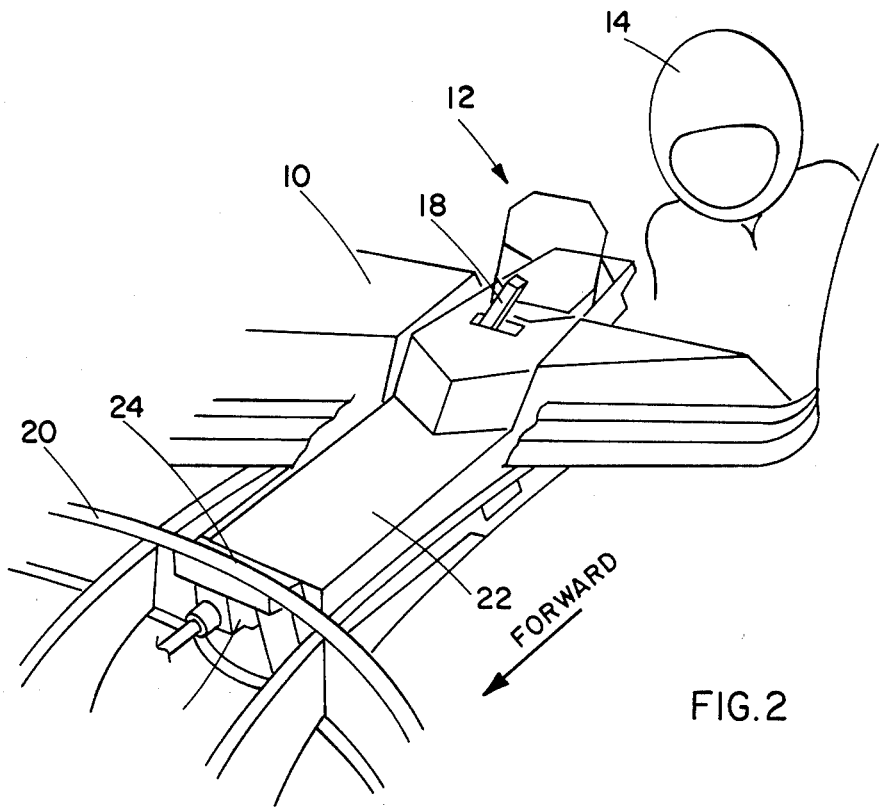
FIG. 2 is a pictorial representation of the HUD of FIG. 1 showing the HUD mounted on the frame of the aircraft in relation to the pilot and the front of the aircraft.

FIG. 2 shows the manner in which the HUD 12 is disposed within the airframe 20 of the aircraft as seen from the forward part of the aircraft. Here, the HUD 12 consists of a generally elongated rectangular chassis 22 which is fitted within a mounting tray 24 which is joined to the airframe 20. The precision aligned mounting tray 24 is preferably installed in the aircraft during nose section build-up. Electrical interface connections are made by means of a standard rack mounted connector 26. Once installed, the mounting tray 24 becomes part of the cockpit structure, and securely and precisely holds the HUD, the electrical tie-ins, and the other relevant aircraft structural elements. Thus, the mounting tray design allows one to install a HUD into the aircraft structure on a simple plug-in basis similar to modern avionic units. It should be appreciated, from the foregoing description, that the HUD installation shown in FIGS. 1 and 2 represents an excellent solution to the difficult design problem in which field-of-view considerations are opposed by cockpit geometry and the sheer availability of cockpit instrument panel space.

Turning to FIG. 3A, the internal components of the HUD chassis 22 are illustrated. The HUD chassis 22 contains a low voltage power supply, an interface with the aircraft's mission computer, a central processing unit (CPU) memory, a symbol generator, a monitor module, a CRT, deflection and linearity correction circuits, display electronics, relay optics, a mirror, and a stowable combiner or screen 28. Modern tactical aircraft are provided with a mission computer and a 1553 data bus. The mission computer acts as the overall display manager and provides HUD display mode commands, guidance commands, and aircraft parameters, such as inertial reference system and air data system outputs. The CPU consists of a microprocessor and associated support chips. The memory consists of EPROM program memory as well as EEPROM and CMOS RAM data memory. The symbol generator is a self-contained module consisting of a dual port RAM, a simple sequencer capable of executing basic graphics instructions, a fixed symbol library located in EEPROM, a vector waveform generator, and redundant test hardware. The monitor module performs the task of conducting an independent monitoring function to detect potential critical system failures. In one design, this function is performed by a check sum comparator which compares a CPU generated master check sum with a HUD operating mode word received from the mission computer via a 1553 data bus interface module.

Figure 3C:
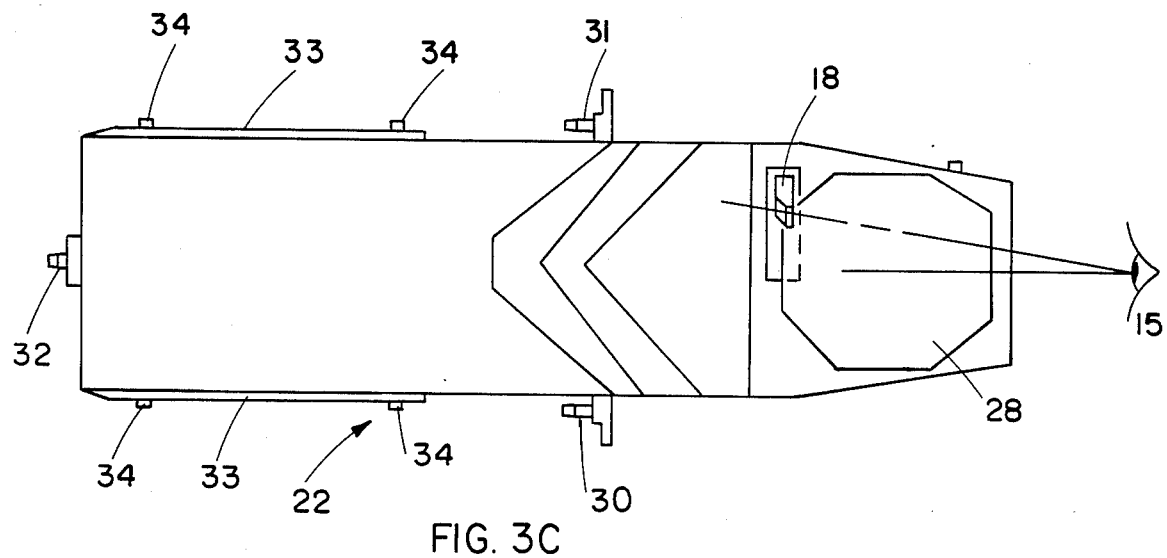
FIG. 3C is a top plan view of the HUD shown in FIG. 3A.

Turning to FIG. 3C, the HUD chassis 22 and the associated mounting tray surfaces 24 are precision machined to achieve the necessary alignment accuracy. Specifically, the HUD chassis 22 is provided with three precision alignment pins 30, 31 and 32. These alignment pins fit within appropriate sockets in the mounting tray 24 to properly align the chassis 22 relative to the airframe 20 (see FIG. 2). The exterior of the HUD chassis 22 is also provided with a flange 33 and guide pins 34 to facilitate its installation in the mounting tray 24.

Turning to the optical portion of the system, the system uses a CRT with a narrow band light emission spectrum and a matched defraction optics combiner for image collimation and super-position on the pilot's visual field (see FIG. 3A). This type of combiner is produced by holographic recording techniques and acts as a very efficient, slightly aspheric reflector of the CRT's light output while it is essentially transparent to ambient light. In this particular embodiment, the combiner 28 is a rigid shell structure which, while stowable, requires minimal support and does not require a frame. The absence of a frame gives the appearance of a "picture window" display which facilitates observation and tracking of visual images across, in and out of the field of view, with minimal discontinuities. The combiner 28 may be stowed to prevent interference with the pilot's line of sight across the cockpit.

Figure 4:
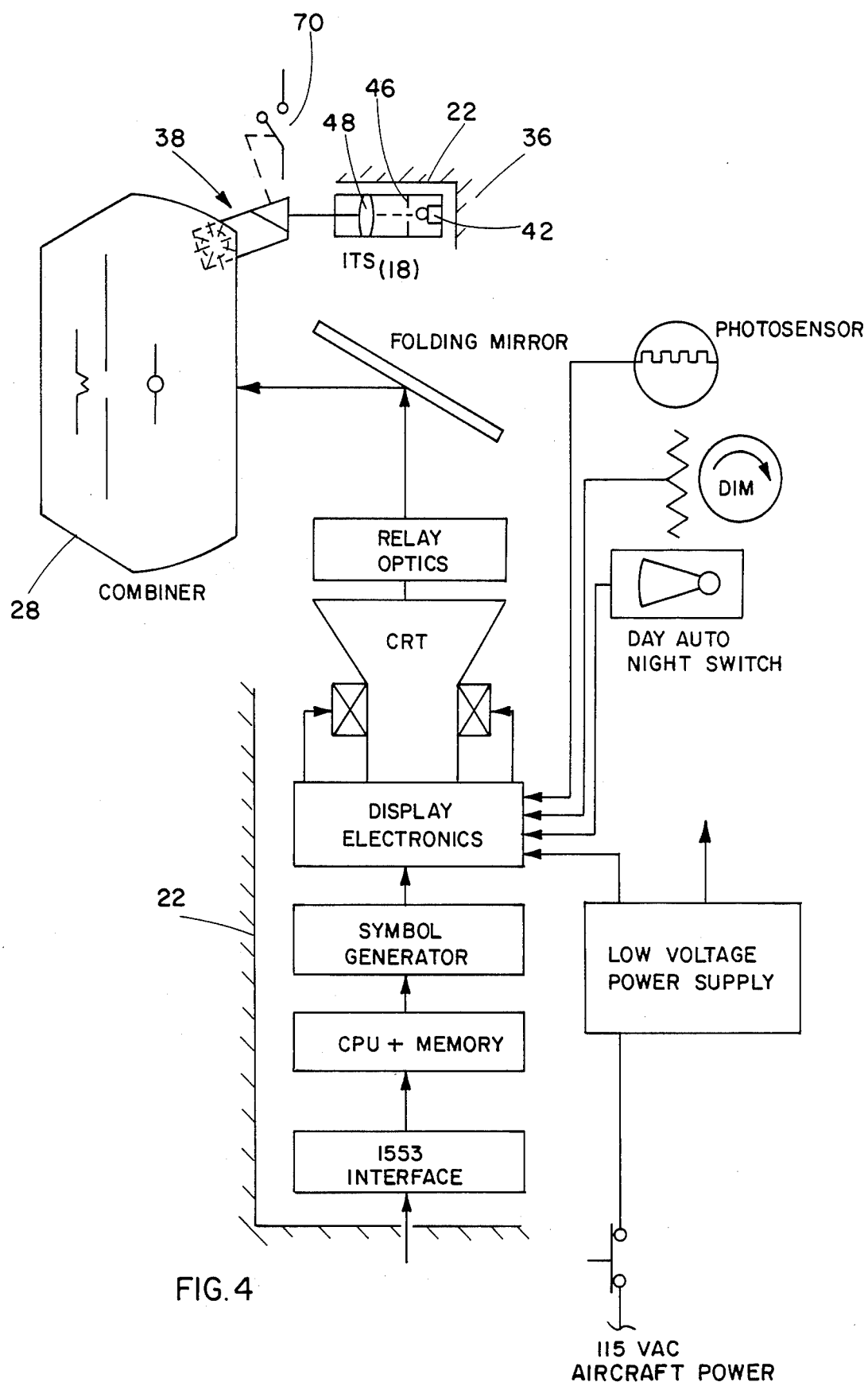
FIG. 4 is a schematic diagram showing the HUD CRT, CRT controls, the relay optics, the folding mirror and the combiner which forms the HUD of FIG. 1.

Turning to FIG. 4, it should be apparent from the foregoing discussion that since the CRT, the relay optics, the folding mirror, and the combiner 28 are all carried by the HUD chassis 22, any misalignment of these components relative to the chassis will result in an image on the combiner 28 which will be inaccurate, displaced or otherwise misaligned in the event that the physical location of any of the foregoing components changes relative to the chassis. The Independent Test Sight (ITS) 18 provides an accurate, reliable and convenient means for detecting such a misalignment.

The major components of the ITS 18 will now be described with reference to FIGS. 5A and 5B. As seen in FIG. 3C, the ITS 18 is positioned forward of the HUD combiner 28 and is stowed out of view (see FIG. 3D) when it is not in use. The ITS 18 consists of two major components: a Collimator Assembly 36 and a Periscope Assembly 38. The accuracy of the ITS 18, as a whole, depends primarily on the stability of the Collimator Assembly 36 and, as will be seen shortly, is independent of the Periscope Assembly's 38 angular orientation relative to the Collimator Assembly. The Collimator Assembly 36 and the Periscope Assembly 38 are mounted within the interior of the HUD chassis 22.

The Collimator Assembly 36 comprises a metal block or frame 40, a source of light 42 (here a LED), a light integrating cavity 44, a reticle 46, and a doublet collimating lens 48. The Collimator Assembly 36 is mounted onto HUD chassis 22 by a set of two-axis alignment screws 50. In one embodiment, the reticle 46 is metalized and chem-milled on filter glass. When ambient light is sufficient, the LED light source 42 need not be used; instead, a defusing acrylic window 52 on top of the HUD chassis 22 provides ambient light to back illuminate the reticle.

Figure 3E:
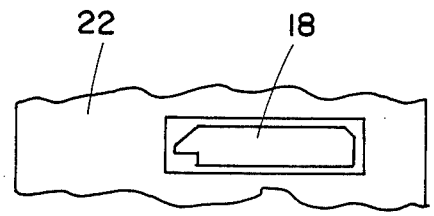
FIG. 3E is a partial plan view of the ITS stowed within the body of the HUD unit of FIG. 3D.
Figure 3D:
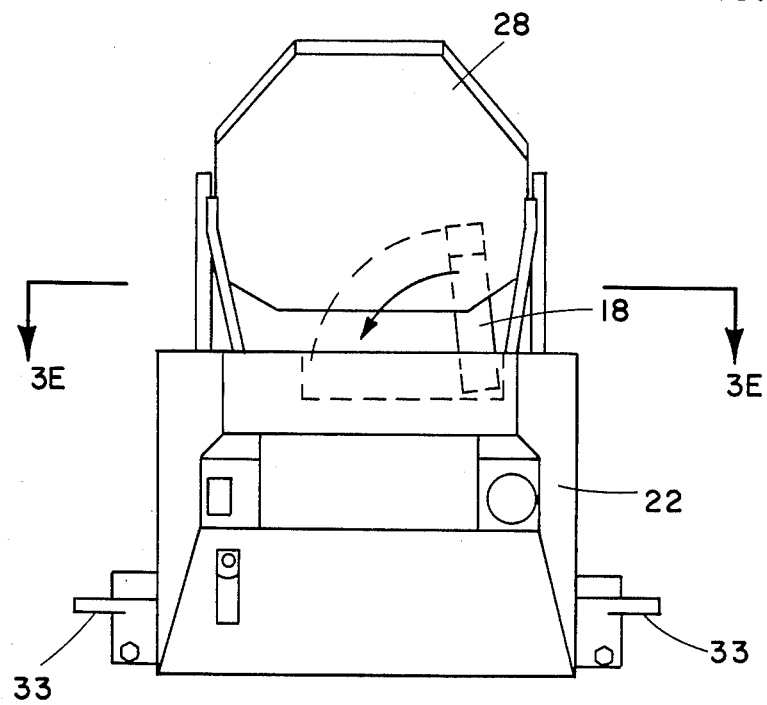
FIG. 3D is an end view of the HUD of FIG. 3A, as viewed by the pilot.

In regard to the Periscope Assembly 38, in one embodiment, the Periscope Assembly 38 comprises a pivotally mounted frame 54 and a rhomboid prism 56. The rhomboid prism 56 defines two parallel faces 58 and 60 which bend or offset the light emitted from the Collimating Assembly 36 from below the upper surface of the HUD chassis 22 to a position above the upper surface of the chassis within the pilot's field of view. The periscope frame 54 is connected to the HUD chassis 22 by means of a pivot assembly 62 comprising a pivot pin and bushing. As is best seen in FIG. 3D, when the ITS 18 is deployed, it assumes a generally vertical orientation. When the ITS 18 is stowed in the HUD chassis, it assumes a generally horizontal orientation (see FIG. 3E).

The insensitivity of system alignment to periscope movement is due to the two-mirror/parallel-window nature of the periscope rhomboid prism 56. Its geometry, and the stability of the glass from which it is fabricated, maintains output rays parallel to input rays regardless of angular orientation of the prism, up to plus or minus 90 degrees relative to the rays. The degree of insensitivity of the prism is high, exceeding the accuracy requirements of the sight by a factor of 10, even with conventional prism fabricating tolerances. Because of this insensitivity, the prism stowing pivot assembly 62 is not critical to sight accuracy. Similarly, vibration of the periscope does not affect the sight accuracy or clarity. Therefore, the Collimator Assembly 36 is the only source of significant sight alignment errors.

The basic simplicity of the Collimator Assembly 36 makes its stability easy to control. Alignment depends only on the alignment of the collimating lens 48 with the reticle 46 and the stability of the alignment adjusting screws 50. Specifically, the lens 48 and reticle 46 are preferably housed in a sturdy, precision machined housing, block or frame 40. These components are cemented in place, sealed and clamped with a bezel to insure rigid location relative to the housing 44. Two pairs of loaded, opposing screws 50 provide for two-axis alignment and high rigidity. The screws 50 secure the setting in each axis.

The Collimator Assembly 36 mounts directly on a dedicated boss on the HUD chassis 18 where it is isolated from movement or forces applied to the Periscope Assembly 38. Therefore, the test sight reference is established relative to the HUD chassis 22.

A loss of visibility of the ITS reticle 46 could prevent verification of the HUD accuracy. This could jeopardize mission completion. It is important, therefore, that the ITS 18 reticle 46 have good contrast and reliable illumination. Tungsten lights for illumination should be avoided because of their low reliability, the complexity necessary to track the ambient illumination, and their high power consumption. Instead, the ITS 18 is preferably illuminated in a manner similar to that used in integrally lighted cockpit panels. That is, it is illuminated by the ambient light during the day and until dusk and, afterwards, a low-level illumination (approximately one foot-lambert) is provided for night viewing. Specifically, the Collimator Assembly 36 collects ambient light incident on it from a small window 52 in the top of the HUD chassis 22; (which is directly below the aircraft's wind screen 16). It uses this light to back light the reticle 46 during the day. At night, the reticle 46 is illuminated with a high-reliability light emitting diode (LED). The LED is always illuminated when the sight is erected and starts supplementing the ambient illumination at dusk.

Day or night, the reticle 46 has high contrast because its background is shielded from all significant light sources. In the preferred embodiment, the reticle color is green. A green filter glass, which is the reticle substrate, provides the green color during the day. Night illumination uses a green LED. Green is preferred for several reasons. It provides color contrast with the HUD display color which is yellowish-green. This reticle color also falls outside the high-reflectivity band of the HUD combiner 28; therefore it is trasmitted efficiently through the combiner to the pilot's eye. Finally, it is compatable with the night vision goggles often used with the HUD.

Operation

The ITS 18 mounts forward of the HUD combiner 28 and is out of view (see FIG. 3E) when not in use. When the accuracy of the HUD display is to be checked, the ITS Periscope Assembly 38 is erected into view by pushing down on one end of the stowed sight periscope frame 54 which rotates the sight into view. The preferred embodiment uses an over-center spring to retain the Periscope Assembly 38 in its stowed position and in its deployed or erect position. A small travel of the finger starts deployment of the Periscope Assembly 38 upwardly. Erection of the Periscope Assembly 38 brings it into the lower, right-hand field of view of the pilot (see FIG. 2) and makes visible the display of radiating reticle lines 66 and the alignment dot 68 (see FIG. 6).

The reticle image is back-lighted and projected to infinity so it can be juxtapositioned with a test pattern on the HUD combiner 28 without parallax during an accuracy check (see FIG. 3C).

Erection of the ITS 18 Periscope Assembly 38 operates a switch 70 (see FIG. 4) which initiates display of a HUD test pattern 72 (see FIG. 6). The test pattern includes a set of concentric alignment rings 72 depicting mission error limits. These rings become visually superimposed for comparison with the sight alignment dot 68. The smaller ring depicts the error limits for an on-the-ground installation/maintainance test while the larger ring provides specific mission in-flight error limits. Different missions or tasks may require different accuracies, so alignment limit patterns may vary. For example, a check prior to landing approach, with the display in the landing approach mode, might display a rectangular alignment limit box, allowing greater system error latitude horizontally than vertically.

The ITS 18 reticle pattern image, as it appears in the sight periscope, is shown at the upper end of FIG. 5A. Also shown in the figure is the test pattern alignment ring image as it would appear overlaying the reticle image. The total reticle image (as indicated by the large radiating line pattern shown in FIG. 5A) subtends a 7-degree diameter circle. This is the total field of view of the sight reticle 46. Of this 7-degree pattern, a 1.2-degree diameter instantaneous field of view can be seen at any one time. The portion seen depends upon the viewer's eye position. In FIG. 5A, the center portion is visible in the upper window of the periscope (i.e., shown by the solid portions of the pattern and the alignment dot 68). In one specific embodiment, the alignment dot 68 is precisely aligned at a specific reference angle 9-degrees below boresight (or 14-degrees below the water-line) and 9-degrees to the right of center (see FIG. 3C). The ITS 18 is positioned for viewing with the left eye 15 and the reticle pattern appears centered in the periscope upper window, as shown in FIG. 5A, when the pilot's eye 15 is in the design eye position. The ITS is located in the corner of the display to improve its effectiveness. By locating the ITS axis in one quadrant of the vertical/horizontal deflection system and by checking for location accuracy of the test pattern at that point, the accuracy of the gain in both deflection axes, as well as the basic zero-deflection offset of the system, can be verified simultaneously.

The converging line pattern 66 of the reticle serves the purpose of leading the viewer to the aim dot 68 in case the eye of the viewer is out of the nominal viewing position. The 7-degree diameter of the pattern allows visibility of the reticle image over a 3 inch diameter circle, centered about the nominal viewing position (or left eye).

In normal operation, the converging lines 66 will not be used. For one familiar with the system, the ITS 18 will be erected and the test pattern rings 72 immediately brought into alignment with the periscope window (by adjustment of the position of the pilot's head), where the alignment dot 68 will appear, and then alignment will be verified. Only in the case of an inaccurate display, when normal procedures are used and no alignment dot appears, might the alignment dot 68 be lost. In this case, the viewer can follow the converging lines 66 to bring the dot 68 into view so the magnitude of the misalignment can be observed and evaluated. For example, FIG. 6D shows a grossly inaccurate display. FIG. 6A illustrates the situation where the HUD 12 is not operating properly for mission completion. Perfect alignment is shown in FIG. 6B. Finally, in FIG. 6C, HUD misalignment is sufficient to insure mission accuracy.

It can be seen from the foregoing that the ITS 18 is a completely dissimilar, essentially redundant HUD channel with high alignment integrity relative to the frame of the aircraft (see FIG. 4); therefore, it can independently verify visual image alignment. It is totally independent of the entire computation-signal path, does not depend upon any electronics, and can accurately measure optical misalignment which is not detectable by any other means. Therefore, it provides monitoring coverage beyond that of any electronic monitoring scheme. More importantly, the pilot can extend the ITS 18 at any time the HUD is powered-up. The extention of the ITS 18 will automatically initiate a specific test pattern on the CRT which can be quickly compared visually to the mechanically permanently collimated reticle of the ITS. Preferably, the projected CRT test pattern will display all major symbols in the HUD repertory and disclose missing or distorted symbology. Thus, in addition to this ITS visual alignment comparison of one zone in the display field, the pilot can gain further information concerning the health of the HUD by simply looking at the CRT pattern during the ITS check.

From the foregoing description, it should be clear that numerous variations and modifications may be effected without departing from the true spirit and scope of the novel concept of the invention. For example:

1. The Periscope Assembly 36 may be pivotably or otherwise moveably stowed and erected (i.e., in one arrangement it may move vertically up and down on straight guides). Also, the pivot point can be anywhere, as long as the periscope ends up in the desired location when erected.

2. The Periscope Assembly 36, to be insensitive to movement, must have input and output rays whose angular relationship remains constant when periscope is moved (i.e., parallel mirrors, a corner cube, reflections from inside surfaces of a mirror or glass cube—also called a retroreflector, etc.). There may be other arrangements of mirrors or internal reflection apparatus that are insensitive to movement, and an infinite number of arrangements with varying degrees of sensitivity. Even a single mirror could be used to reflect the reticle image into the line of sight, although it would be very sensitive to movement and would require high angular stability and repeatability, if stowable. However, the preferred embodiment of the ITS uses a rhomboid prism periscope because it is readily fabricated with high accuracy and optical stability to provide insensitivity of output ray angles to periscope movement. Although a pair of parallel mirrors could provide the same function, a mirror assembly is generally not as mechanically stable and is more difficult to clean than a rhomboid prism. Other mirror and internal reflection arrangements will doubtless provide near-zero or adequately low sensitivity movement and may allow different angular relationships between the input (collimator) and output (visual) rays. One example is a corner cube or retroreflector in which the input and output rays are parallel but travel in opposite directions. This would allow the collimator to be mounted aft of the periscope; however, it would require three reflecting surfaces. Moveover, it is larger than parallel reflectors and is most likely less economical to build.

Another example would be a prism or mirrors deviating from parallel to allow for a specific angular mounting of the collimator. However, such a system would be a compromise between loss of insensitivity and mounting flexibility.

Still another catagory of periscope could use a partially reflective, or beamsplitter mirror in the upper or viewed end of the periscope (in lieu of an opaque mirror) to permit positioning of the periscope between the beamsplitter and the viewer. The semi-transparent beamsplitter would permit viewing through the periscope for superimposition of the target image on the HUD test pattern. A rhomboid prism with a cemented beamsplitter at the viewed end would serve this purpose, as would a beamsplitter substituted for the viewed mirror of a parallel mirror pair. The disadvantage of the beamsplitter periscope is the loss of light efficiency, making illumination of the reticle by ambient light impractical, and the need for high intensity reticle lighting that can compete with sunlight. The lighting must also track the ambient to maintain reasonable contrast over several decades of light intensity which causes undesirable complications.

3. The ITS need not be stowable, except if required to remove it from the pilot's view.

4. Finally, this invention is equally applicable to HUD's of the on-axis variety (i.e., U.S. Pat. No. 4,082,432).

It should be understood that no limitation with respect to the specific apparatus illustrated herein is intended or should be inferred. It is, of course, intended to cover, by the appendent claims, all such modifications as fall within the scope of the claims.

We claim:

1. In a pilot's head-up display having a frame which carries a combiner and projector means for projecting a test image on the combiner, an independent test sight, comprising:
   (a) a source of light; and
   (b) target means, carried by the frame, for projecting said source of light in the form of a target image in the field of view of the pilot which, in the event that the projector means is properly aligned relative to the frame, essentially coincides with the test image as seen by an eye of the pilot.

2. The head-up display of claim 1, wherein said target means includes:
   (a) a reticle; and
   (b) collimating means for collimating light passing through said reticle to form said target image along a target axis.

3. The head-up display of claim 1, wherein said source of light comprises a collimator assembly and wherein said target means comprises a periscope having two windows with one window aligned to said collimator assembly.

4. The head-up display of claim 2, wherein the combiner defines a pilot viewing axis, and wherein said target axis lies in a plane spaced apart from a plane containing said pilot viewing axis;
   further including bending means, carried by the frame, for bringing said target axis in essentially said plane containing said pilot viewing axis.

5. The head-up display of claim 4, wherein said bending means comprises a prism defining two parallel spaced apart faces with one face aligned to intercept said target axis.

6. The head-up display of claim 4, wherein said bending means comprises two parallel spaced apart mirrors with one mirror having a face aligned to intercept and reflect light on said target axis to the other mirror.

7. The head-up display of claim 4, further including housing means for housing said collimating means within said frame.

8. The head-up display of claim 7, wherein said housing means includes means for pivotally connecting said bending means to said frame such that said bending means is free to move between a stowed position and a test position, said bending means, when in said stowed position, being disposed generally horizontal.

9. The head-up display of claim 1, wherein said source of light comprises a light emitting diode.

10. The head-up display of claim 2, wherein said collimating means comprises a lens with said reticle disposed between said source of light and said lens.

11. The head-up display of claim 1, wherein said projector means comprises:
   (a) a CRT having a face on which images are formed; and
   (b) optical means for optically transferring said images from said face of said CRT to the combiner.

12. The head-up display of claim 11, wherein said optical means comprises a plurality of lenses aligned to refract to the screen the light emitted by said images on said face of said CRT.

13. The head-up display of claim 11, further including electronic means for controlling said CRT to produce images on said face of said CRT at pre-selected locations.

14. The head-up display of claim 1, wherein said source of light comprises a light transparent window disposed to receive light from the ambient and pass light into the frame.

15. The head-up display of claim 1, wherein said projector means comprises:
   (a) a CRT having a face on which images are formed; and
   (b) a mirror aligned to reflect said images onto the combiner.

16. The head-up display of claim 1, wherein said target image is formed at a position which is spaced apart from the focal plane of the combiner.

17. A head-up display for a pilot of a vehicle, comprising:
   (a) a chassis removably carried by the vehicle;
   (b) an essentially transparent combiner foldably carried by said chassis and aligned to the pilot's field-of-view;
   (c) a CRT, carried within said chassis having a face on which images are formed;
   (d) optical means, carried by said frame, for optically transferring said images from said face of said CRT to said combiner;
   (e) electronic means, carried by said frame, for controlling said CRT to produce a test image on the face of said CRT at a pre-selected location, whereby a test image is formed relative to said combiner with an eye of the pilot and said test image on said combiner defining a pilot viewing axis;
   (f) a source of light carried by said frame; and
   (g) target means, carried by said frame, for projecting said source of light at a location relative to said combiner which, in the event that said electronic means and said CRT and said optical means and said combiner are properly aligned relative to said chassis, essentially coincides with said test image as seen by said eye of the pilot.

18. The head-up display of claim 17, wherein said combiner is disposed between the pilot and said target image.

19. The head-up display of claim 17, wherein said target means comprises:
   (a) a reticle exposed to said source of light;
   (b) a lens for collimating the light passing through said reticle to define a first optical axis;
   (c) a prism stowably mounted to said chassis and disposed to move between a stowed position within said chassis and a test position at least partially extending outside of said chassis, said prism defining two parallel spaced apart faces with one face aligned to receive collimated light passing through said reticle, whereby the other face of said prism defines a second optical axis which is spaced apart from said first optical axis, and in the same plane, said other face of said prism being spaced apart from said one face such that said second optical axis intersects said pilot viewing axis when said prism is pivoted to its test position.

20. The head-up display of claim 17, wherein said target means comprises:
(a) a holder removably carried within said chassis;
(b) a reticle carried by said holder;
(c) a lens, carried by said holder, for collimating the light radiating from said source and through said reticle; and
(d) means for bending the light radiating from said lens so as to intercept said pilot viewing axis.

21. The head-up display of claim 17, wherein said source is a light emitting diode.

22. The head-up display of claim 20, wherein said holder is secured to said chassis by at least two threaded fasteners disposed at generally right angles to each other.

* * * * *